United States Patent
Hasegawa et al.

(10) Patent No.: US 7,697,025 B2
(45) Date of Patent: Apr. 13, 2010

(54) CAMERA SURVEILLANCE SYSTEM AND METHOD FOR DISPLAYING MULTIPLE ZOOM LEVELS OF AN IMAGE ON DIFFERENT PORTIONS OF A DISPLAY

(75) Inventors: Hiroyuki Hasegawa, Tokyo (JP); Hideki Hama, Tokyo (JP); Hiroshi Nedu, Chiba (JP); Takeyoshi Kuroya, Shizuoka (JP); Masaaki Kurebayashi, Shizuoka (JP)

(73) Assignee: Sony Corporation, Tokyo (JP)

( * ) Notice: Subject to any disclaimer, the term of this patent is extended or adjusted under 35 U.S.C. 154(b) by 1755 days.

(21) Appl. No.: 10/649,150

(22) Filed: Aug. 27, 2003

(65) Prior Publication Data
US 2005/0100087 A1 May 12, 2005

(30) Foreign Application Priority Data
Aug. 28, 2002 (JP) ............................ 2002-248437
Aug. 28, 2002 (JP) ............................ 2002-248438

(51) Int. Cl.
H04N 7/18 (2006.01)
(52) U.S. Cl. .................... 348/143; 348/14.13; 348/135; 348/208.1
(58) Field of Classification Search ................ 348/135, 348/208.1, 143, 14.13
See application file for complete search history.

(56) References Cited

U.S. PATENT DOCUMENTS

| | | | | |
|---|---|---|---|---|
| 5,005,083 A | * | 4/1991 | Grage et al. | 348/588 |
| 5,682,197 A | * | 10/1997 | Moghadam et al. | 348/36 |
| 5,754,230 A | * | 5/1998 | Tsuruta | 348/333.12 |
| 5,973,726 A | * | 10/1999 | Iijima et al. | 348/38 |
| 6,091,771 A | * | 7/2000 | Seeley et al. | 375/240 |
| 6,466,254 B1 | * | 10/2002 | Furlan et al. | 348/36 |
| 6,529,234 B2 | * | 3/2003 | Urisaka et al. | 348/211.99 |
| 6,624,846 B1 | * | 9/2003 | Lassiter | 348/211.4 |
| 6,646,677 B2 | * | 11/2003 | Noro et al. | 348/156 |
| 6,757,008 B1 | * | 6/2004 | Smith | 348/143 |
| 6,771,306 B2 | * | 8/2004 | Trajkovic et al. | 348/170 |

(Continued)

FOREIGN PATENT DOCUMENTS

EP 0 878 965 11/1998

(Continued)

*Primary Examiner*—Jason Chan
*Assistant Examiner*—Usman Khan
(74) *Attorney, Agent, or Firm*—Frommer Lawrence & Haug LLP; William S. Frommer; Paul A. Levy

(57) ABSTRACT

Positional and elevation data obtained from a camera unit is correlated with coordinates in an entire image display portion, used as a GUI having positional information to select a specified image with a mouse. Which frame this corresponds to in the entire image is calculated, and further, the position within the clicked frame is calculated. The calculated positional information is converted into positional information and elevation data of the frame. The camera unit is controlled with the positional information and elevation data from the camera unit, and an image of a range indicated by a specified image display frame superimposed on the display portion is taken, and stored and/or displayed. This allows confirmation an image of a range to be photographed beforehand, and the user can tell the relation between the range capable of acquiring images and the photography range at a glance, so desired portions can be continuously monitored.

9 Claims, 11 Drawing Sheets

U.S. PATENT DOCUMENTS

| | | |
|---|---|---|
| 6,977,676 B1 * 12/2005 | Sato et al. | 348/211.11 |
| 7,136,096 B1 * 11/2006 | Yamagishi et al. | 348/218.1 |
| 7,161,623 B2 * 1/2007 | Kuno | 348/211.3 |
| 7,254,482 B2 * 8/2007 | Kawasaki et al. | 701/211 |
| 7,343,050 B2 * 3/2008 | Kato et al. | 382/284 |
| 2001/0040636 A1 * 11/2001 | Kato et al. | 348/333.03 |
| 2002/0152557 A1 * 10/2002 | Elberbaum | 8/405 |
| 2002/0191076 A1 * 12/2002 | Wada et al. | 348/78 |
| 2003/0071891 A1 4/2003 | Geng | |
| 2003/0085997 A1 * 5/2003 | Takagi et al. | 348/143 |

FOREIGN PATENT DOCUMENTS

| | | |
|---|---|---|
| EP | 1 158 473 | 11/2001 |
| EP | 1 162 830 | 12/2001 |
| JP | 5 242167 | 9/1993 |
| JP | 9 233384 | 9/1997 |
| JP | 10 164563 | 6/1998 |
| JP | 10 290387 | 10/1998 |
| JP | 10 290412 | 10/1998 |
| JP | 11 8845 | 1/1999 |
| JP | 11 88767 | 3/1999 |
| JP | 11 252534 | 9/1999 |
| JP | 2000 224542 | 8/2000 |
| JP | 2001 251607 | 9/2001 |
| JP | 2001 325695 | 11/2001 |

\* cited by examiner

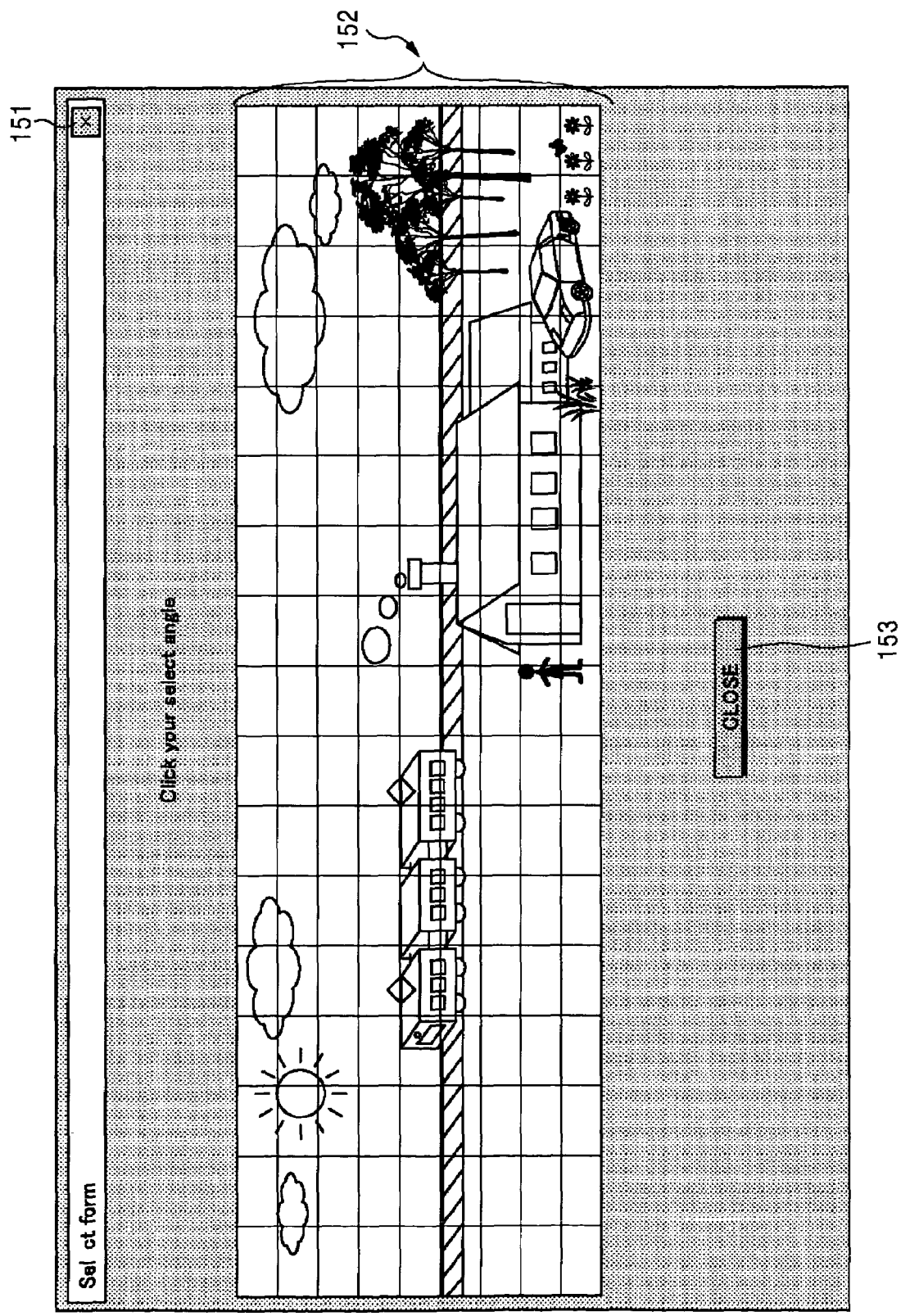

CAMERA SURVEILLANCE SYSTEM AND METHOD FOR DISPLAYING MULTIPLE ZOOM LEVELS OF AN IMAGE ON DIFFERENT PORTIONS OF A DISPLAY

BACKGROUND OF THE INVENTION

1. Field of the Invention

The present invention relates to a monitoring system and method, program, and recording medium, applied to surveillance cameras and the like.

2. Description of the Related Art

Conventionally, monitoring systems have been used to monitor situations over wide ranges. Examples of monitoring systems are used to monitor marine and river areas, off-limit areas, observation of animal behaviors, and so forth. Such monitoring systems take images over a wide range, and accordingly video cameras with an extremely great number of pixels have been used. This has resulted in increased costs of the system.

An alternative arrangement has been proposed, wherein the photography range of the camera is shifted in order while taking still images, and a great number of still images are linked so as to generate an image of a range to be monitored. In this case, the linked image generated by linking a great number of still images can be formed as an extremely high resolution image. Accordingly, in the event of enlarging a part of the linked image, the resolution of the enlarged image itself is high, so clear images can be obtained for enlarged images as well.

An extremely wide range of motion is required for the cameras, such as 180° or 360°, due to the need to have a wide range of monitoring. The direction of photography of the camera is switched over this wide range, still images are obtained in each direction of photography, and a panorama-like linked image is formed.

The wider the range of photography is, the greater the number of still images making up the wide-range still image, meaning that the time required for obtaining the image becomes longer, resulting in the problem of longer cycles for obtaining a linked image. However, the area regarding which monitoring is desired is actually often much more restricted.

Accordingly, the present assignee has proposed in Japanese Patent Application No. 2002-130761 a system wherein areas in a wide range are cropped per field angle, images of the cropped field angles are acquired with normal image-taking devices, and the acquired images are combined to obtain a highly-fine and wide-range image.

However, even this system depended on moving the camera to take live pictures and confirming the taken pictures for determining the area which is actually to be monitored. Also, there was no way therein to notify the user at a glance regarding the relation between the range over which images can be taken in and the photography range.

Moreover, even areas to be monitored in further detail are taken as multiple images, so a certain amount of time is required to photograph those portions again, and accordingly, such portions cannot be monitored at time spans shorter than the certain amount of time.

SUMMARY OF THE INVENTION

Accordingly, it is an object of the present invention to provide a monitoring system and method, program, and recording medium, capable of allowing confirmation of an image of the photography range beforehand, capable of notifying the user at a glance regarding the relation between the range over which images can be taken in and the photography range, and capable of continuously monitoring portions to be monitored in particular.

According to one aspect of the present invention, a monitoring system for monitoring a predetermined location comprises: a first image display portion for storing in a storage unit image data, taken of different positions with a first camera unit capable of changing direction of taking images, with position information attached to each set of image data, and displaying either compressed images of the taken image data having been compressed or compressed images of the image data stored in the storage unit having been compressed, at a position based on corresponding position information, with position information of each of the taken image data sets being assembled therein; and a second image display portion which, upon a first indicating display for indicating a predetermined range being superimposed on the first image display portion and a predetermined range being selected with the first indicating display, takes moving image data of the predetermined range selected with a second camera unit capable of changing direction of taking images, and displays the taken moving image data.

According to another aspect of the present invention, a monitoring system for monitoring a predetermined location comprises: first and second camera units which each have an image-taking unit for taking pictures, an image-taking direction changing unit for enabling the direction of taking pictures with the image-taking unit to be changed, position information detecting means for detecting positional information of image data taken with the image-taking unit within the maximum movement range of the image-taking direction changing unit, and a storage unit for adding the detected position information to the image data and storing the image data with the position information attached thereto; and a first image display portion for displaying either compressed images of the image data taken by the first camera unit having been compressed or compressed images of the image data stored in the storage unit having been compressed, at a position based on corresponding position information, with position information of each of the taken image data sets being assembled therein; wherein, upon a first indicating display for indicating a predetermined range being superimposed on the first image display portion and a predetermined range being selected with the first indicating display, the second camera unit capable of changing direction of taking images takes moving image data of the selected desired range, and a second image display portion displays the taken moving image data.

According to another aspect of the present invention, a monitoring system for monitoring a wide area comprises: a first image group for storing in a storage unit image data, taken of different positions with position information attached to each set of image data, and displaying either compressed images of the taken image data having been compressed or compressed images of the image data stored in the storage unit having been compressed, at a position based on corresponding position information, with position information of each of the taken image data sets being assembled therein; a second image group which, upon a sighting line for identifying a predetermined range being superimposed on the first image group and a predetermined range being selected with the sighting line, takes image data of the positional information of the predetermined range selected, and displays the taken image data at the corresponding portions; and a display unit for displaying the first and the second image groups on mutually different regions.

According to another aspect of the present invention, a monitoring system for monitoring a wide area comprises: an image-taking unit for taking pictures; an image-taking direction changing unit for enabling the direction of taking pictures with the image-taking unit to be changed; position information detecting means for detecting positional information of image data taken with the image-taking unit within the maximum movement range of the image-taking direction changing unit; a storage unit for adding the detected position information to the image data and storing the image data with the position information attached thereto; and a display unit for displaying either compressed images of the taken image data having been compressed or compressed images of the image data stored in the storage unit having been compressed, at a position based on corresponding position information, and displaying the first image group with position information of each of the taken image data sets being assembled therein; wherein, upon a sighting line for indicating a predetermined range being superimposed on the first image group and a predetermined range being selected with the sighting line, the image taking direction of the image taking unit is changed based on positional information of the selected desired range, image data within the selected desired range is taken, and a second image group for displaying the taken image data at corresponding positions is displayed on a different region on the display unit from the first image group.

According to yet another aspect of the present invention, a monitoring system for monitoring predetermined locations comprises: storage means for storing image data, taken of different positions with a first camera unit, with position information attached to each set of image data; a display unit for displaying either compressed images of the taken image data having been compressed or compressed images of the image data stored in the storage unit having been compressed, at a predetermined position corresponding to each image set of image data, thereby displaying an entire image; and indicating display means for indicating a predetermined range of an entire image on the display; wherein a second camera unit is shifted to the position based on the position information of image data corresponding to the range in the indicating display, and consecutively taking images of the location corresponding to the position indicated with the second camera unit.

The monitoring system according to the present invention thus has first and second camera units capable of moving the photography direction thereof over a wide range, and the second camera unit can be operated (controlled), using a first group image display portion where multiple sets of image data taken with the first camera unit are gathered with positional information of the first camera unit assembled therein as a GUI. In other words, controlling the second camera unit based on the positional information of the first camera unit allows particular positions regard which monitoring is desired to be continuously taken, recorded, and/or displayed. Further, the movement range image in the maximum range over which the image-taking unit can be moved is displayed, so the direction of image-taking to obtain images of a desired range can be readily set, thereby improving operability.

According to the present invention configured thus, what sort of image is going to be acquired from the movement range of a pan/tilter device for a camera having a wide movement range can easily be displayed as user information, and camera control can be easily carried out using the display. Even in the event that there is a need to monitor a wide-range area, the camera can be directed easily, and necessary images can be acquired without mistakes.

According to the present invention, a camera unit for intermittently taking images in the time direction, and a camera unit for taking images of a specified area alone to intensively and consecutively monitor this area, are provided, to sequentially move the camera and acquire images in order to display images over a wide range, so missed information in the area to be intensively and consecutively monitored can be supplemented. Further, the displayed wide-range image can be used as a GUI, so the camera unit can be positioned so as to take pictures of a specified range alone, in a sure an instantaneous manner.

Thus, the present image enables the range over which photography can be made in the spatial direction to be expanded, the image-taking intervals in the time direction can be made shorter, and further, resolution can be improved. Particularly, specified areas can be taken as moving image data, and recorded and/or displayed.

BRIEF DESCRIPTION OF THE DRAWINGS

FIG. 6 is a drawing describing an example of a selection screen display with the embodiment of the present invention;

DESCRIPTION OF THE PREFERRED EMBODIMENTS

Figure 1:
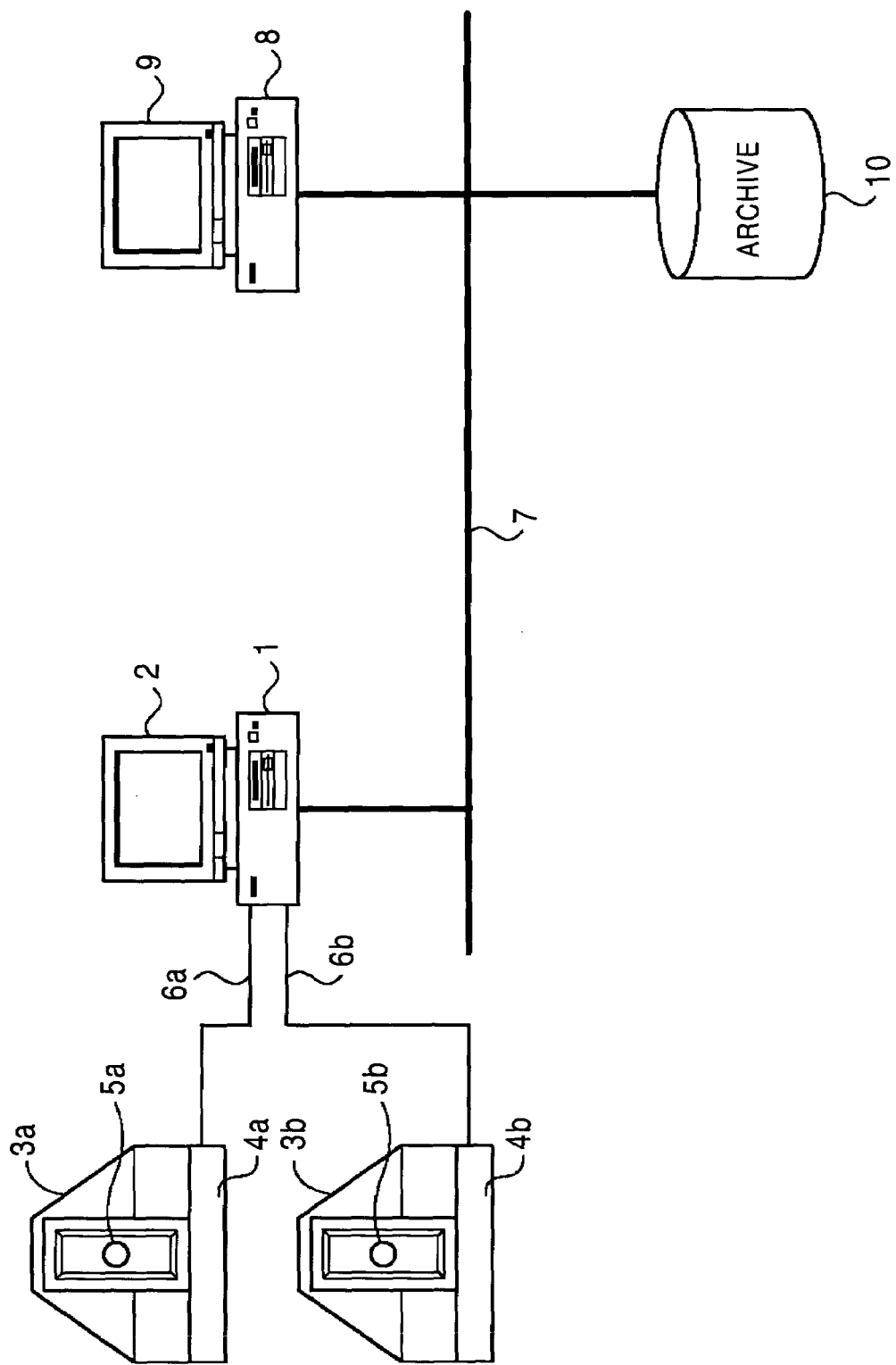
FIG. 1 is a block diagram schematically illustrating a monitoring system according to an embodiment of the present invention.

The following is a description of an embodiment of the present invention, with reference to the drawings. FIG. 1 illustrates a schematic configuration of an embodiment of the present invention. A computer 1 connected to a display 2 controls camera units 3a and 3b. The example shown in FIG. 1 is an example of a system wherein one computer 1 controls two camera units 3a and 3b. Other arrangements may be made wherein one computer controls a greater number of cameras.

The camera units 3a and 3b have pan/tilt units 4a and 4b, and cameras 5a and 5b configured integrally. The camera units 3a and 3b are installed so as to be capable of taking images of distant areas to be monitored. As an example, the cameras 5a and 5b have telephoto lenses with magnification of 10 times, 70 times, or the like, and can take images anywhere from ten meters or so up to several kilometers away. With this embodiment, the camera unit 3b configured of the pan/tilt unit 4b and the camera unit 5b is for taking images of a specified region, as an example.

The cameras 5a and 5b are digital still cameras wherein the shutter can be operated synchronously with an external trigger signal for example, having an image taking device such as a CCD (Charge Coupled Device) with a number of pixels complying with VGA images (Video Graphics Array images, 640 by 480 pixels), XGA images (extended Graphics Array images, 1024 by 768 pixels), SXGA images (Super extended Graphics Array images, 1280 by 1024 pixels), or the like. In the event of an image-taking device for VGA images, image data is output at a rate of 30 fps (frames/second), in the event of an image-taking device for XGA images, image data is output at a rate of 15 fps, and in the event of an image-taking device for SXGA images, image data is output at a rate of 7.5 fps.

The picture data is transmitted from the camera units 3a and 3b to the computer 1 via busses 6a and 6b. The busses 6a and 6b transmit picture data supplied from the camera units 3a and 3b, and control signals supplied from the computer 1.

The computer 1 stores picture data from the camera units 3a and 3b in memory, with the camera units 3a and 3b controlled such that an operating GUI (Graphical User Interface) is configured whereby a user can take images of desired regions with the camera units 3a and 3b, as described later. The taken images are compressed by compression encoding such as JPEG (Joint Photographic Experts Group), for example.

The computer 1 is connected with another computer 8 via a LAN (Local Area Network) 7. Reference numeral 9 denotes the display of the computer 8. The computer 8 receives image data and so forth from the computer 1 over the LAN 7, stores the picture data in an archive 10, and further performs image data processing. Examples of the image data processing include facial recognition, cargo recognition, environment recognition, vehicle recognition, and so forth, performed using the picture data, for example. The archive 10 is capable of storing massive amounts of data, such as with a tape streamer.

Figure 2:
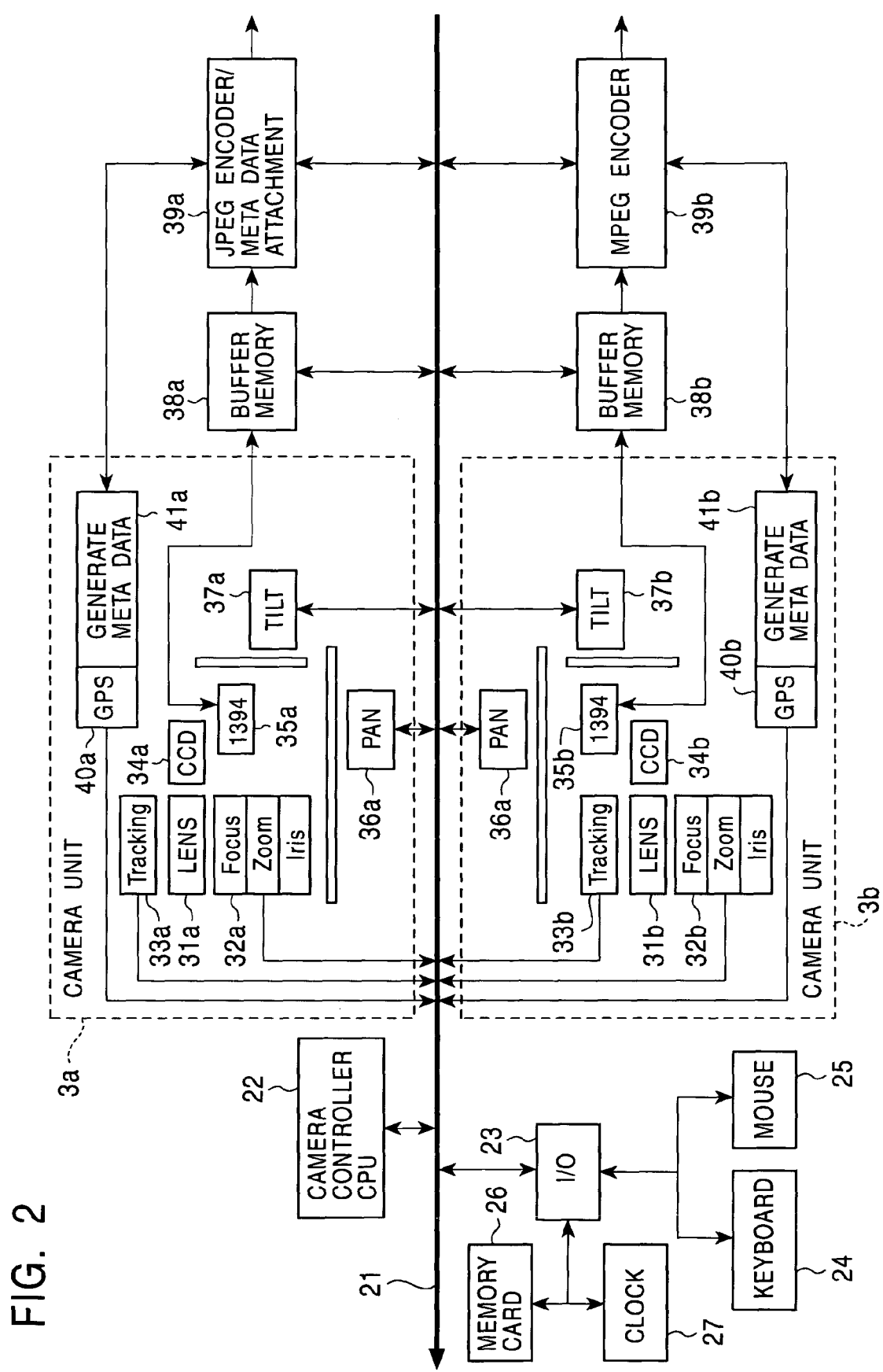
FIG. 2 is another block diagram of the embodiment of the present invention.
Figure 3:
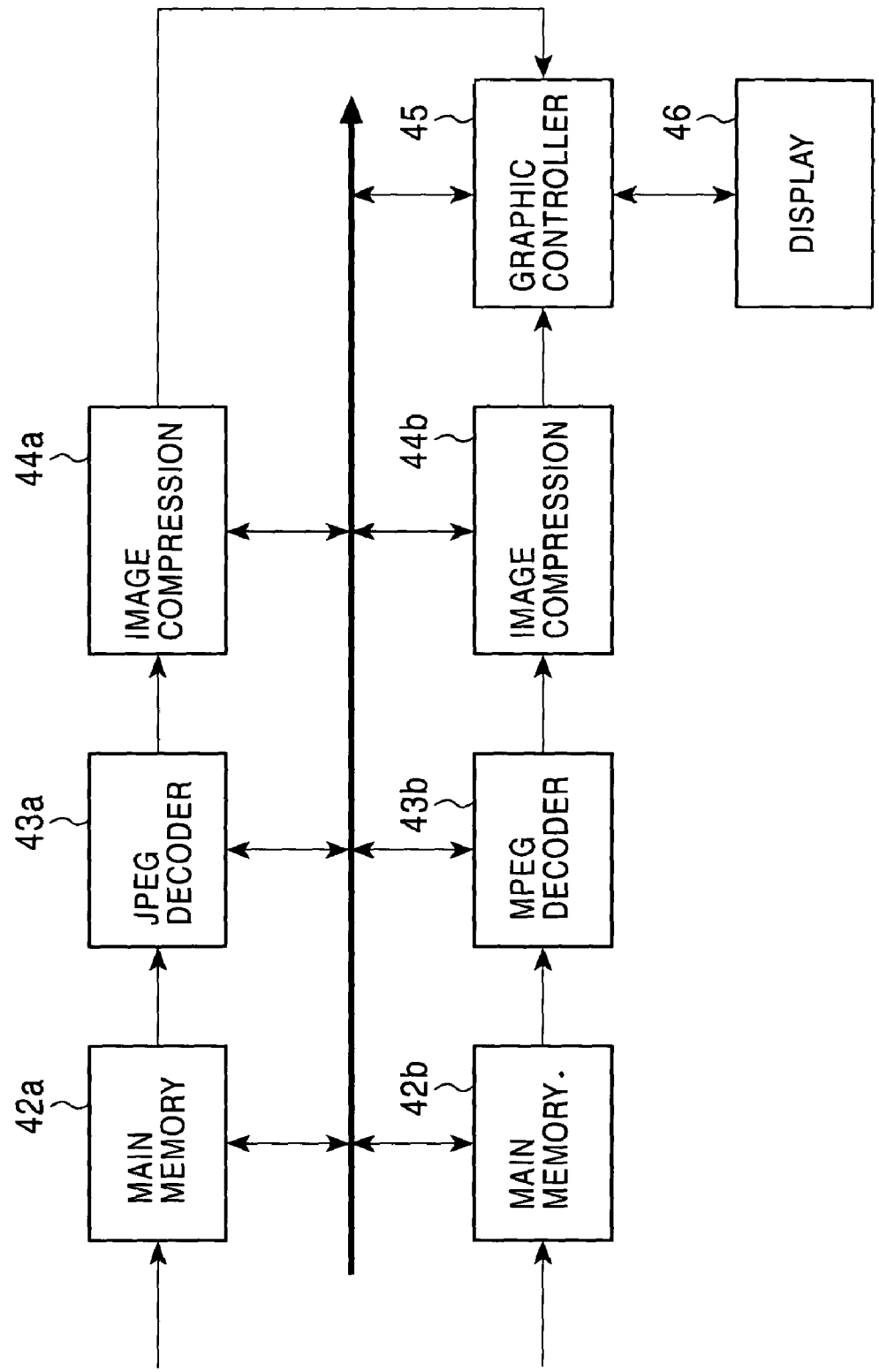
FIG. 3 is another block diagram of the embodiment of the present invention.

FIGS. 2 and 3 illustrate a more detailed configuration of the computer 1 and camera units 3a and 3b in the above-described monitoring system. In the example shown in FIGS. 2 and 3, the components of the computer 1 and camera units 3a and 3b are connected to a common controller bus indicated by reference numeral 21. Note that hereafter, the reference numerals denoting components of the block performing control or signal processing of the camera unit 3a will be followed by the character "a", while the reference numerals denoting components of the block performing control or signal processing of the camera unit 3b will be followed by the character "b".

The camera unit 3a is configured of a lens unit 31a, a focus/zoom/iris control unit 32a, a tracking unit 33a, an image-taking unit 34a, an IEEE (Institute of Electrical and Electronics Engineers) 1394 interface 35a, a pan unit 36a, and a tilt unit 37a. The camera unit 3a is controlled by control signals supplied from a controller CPU (Central Processing Unit) 22 via a controller bus 21. Note that the lens unit 31a, focus/zoom/iris control unit 32a, tracking unit 33a, image-taking unit 34a, and IEEE 1394 interface 35a, are provided above the pan unit 36a and tilt unit 37a as a camera unit of the camera unit 3a.

The camera unit 3b is configured of a lens unit 31b, a focus/zoom/iris control unit 32b, a tracking unit 33b, an image-taking unit 34b, an IEEE 1394 interface 35b, a pan unit 36b, and a tilt unit 37b. The camera unit 3b is controlled by control signals supplied from the controller CPU (Central Processing Unit) 22 via the controller bus 21. Note that the lens unit 31b, focus/zoom/iris control unit 32b, tracking unit 33b, image-taking unit 34b, and IEEE 1394 interface 35b, are provided above the pan unit 36b and tilt unit 37b as a camera unit of the camera unit 3b.

The pan unit 36a and tilt unit 37a, and the pan unit 36b and tilt unit 37b, each have a stepping motor for example as the driving source thereof, so as to pan and/or tilt the camera unit according to control signals supplied from the controller CPU 22 via the controller bus 21. Now, "panning" refers to rotating the camera horizontally, and "tilting" refers to rotating the camera vertically. As one example, the maximum value of the pan angle is ±90°, and the maximum value of the tile tangle is ±45°.

Each time the center of photography is moved by a field angle, the shutter is operated, so as to take still images (hereafter also referred to as "frames" where appropriate) at 1/60 second intervals or 1/30 second intervals. This means that moving pictures are being taken with the camera unit, with individual still images being supplied for subsequent processing at 1/60 second intervals or 1/30 second intervals. With the present embodiment, still images are taken at 1/30 second intervals as one example.

An M number of frames in the vertical direction (8, for example) and an N number of frames in the horizontal direction (16, for example) for a total of 128 frames (M×N=8× 16=128) are taken in sequence, and these are compressed. Each frame is an XGA (1024×768 pixels) image, for example. Accordingly, the 128 frames make up an image of approximately 100 million pixels (1024×16=16,384 pixels horizontally and 768×8=6,144 pixels vertically), ignoring the overlapping portions. Approximately 5 seconds are needed to take the 128 frames. With the present embodiment, the overlapping portions of the adjacent frames are 16 pixels in both the horizontal and vertical directions.

The focus/zoom/iris control units 32a and 32b are controlled by control signals supplied from the controller CPU 22 via the controller bus 21. The image-taking units 34a and 34b include a solid-state image-taking device such as a CCD (Charge Coupled Device) for example, and a camera signal processing circuit. Digital picture signals from the image taking units 34a and 34b are written to the buffer memory 38a and 38b via the IEEE 1394 interfaces 35a and 35b.

At the tracking unit 33a, a predetermined lens of the lens unit 31a is shifted corresponding to the movement of the pan unit 36a and the tilt unit 37a, so that the movement of the pan unit 36a and the tilt unit 37a is countered. At the tracking unit 33b, a predetermined lens of the lens unit 31b is shifted corresponding to the movement of the pan unit 36b and the tilt unit 37b, so that the movement of the pan unit 36b and the tilt unit 37b is countered. Thus, 1/60 second or 1/30 second still images without blurring can be taken.

The output data of the buffer memory 38a is supplied to a JPEG (Joint Photographic Experts Group) encoder/meta data addition unit 39a, where the image data is converted into JPEG data. Note that JPEG is only one of several types of compression, so other compression methods may be used, or the image data may be used uncompressed. Also, the output data of the buffer memory 38b is supplied to an MPEG (Moving Picture Coding Experts Group) encoder 39b, where the moving image data is converted into MPEG data. Note that MPEG is only one of several types of compression, and other compression methods may be used instead.

The camera units 3a and 3b have GPS (Global Positioning System) devices 40a and 40b for detecting the positions thereof. Having the GPS devices 40a and 40b allows data of the position where the camera is installed to be recorded, and also to detect the orientation of the camera and to control the orientation of multiple cameras in a synchronized manner. The GPS devices 40*a* and 40*b* are controlled by control signals supplied from the controller CPU 22 via the controller bus 21.

The output signals of the GPS devices 40*a* and 40*b* are supplied to meta data generating units 41*a* and 41*b*, where positional information based on the measurement results of the GPS devices 40*a* and 40*b* (information such as latitude, longitude, orientation, altitude, etc.), and meta data (information such as time, camera unit parameters (magnification, focus value, iris value, etc.) and so forth) is generated.

The positional information and meta data generated at the meta data generating unit 41*a* is supplied to the JPEG encoder/meta data addition unit 39*a*. At the JPEG encoder/meta data addition unit 39*a*, positional information and meta data is attached to the JPEG data. The JPEG data to which positional information and meta data has been attached is stored in the main memory 42*a*.

The JPEG data read out from the main memory 42*a* is decoded into image data at a JPEG decoder 43*a*. The decoded image data is supplied to an image compression unit 44*a*. At the image compression unit 44*a*, the image data is compressed so as to be capable of being displayed on the movement range image display portion or entire image display portion displayed on the display unit 46, and a thumbnail is generated. The generated thumbnail is supplied from the image compression unit 44*a* to the graphic controller 45.

The positional information and meta data generated at the meta data generating unit 41*b* is supplied to the MPEG encoder 39*b*. At the MPEG encoder 39*b*, positional information and meta data is attached to the MPEG data of predetermined image data. The MPEG data to which positional information and meta data has been attached is stored in the main memory 42*b*.

The MPEG data read out from the main memory 42*b* is decoded into moving image data at an MPEG decoder 43*b*. The decoded moving image data is supplied to an image compression unit 44*b*. At the image compression unit 44*b*, the moving image data is compressed so as to be capable of being displayed on the specified image display portion displayed on the display unit 46, and moving image data of a predetermined size is generated. The generated moving image data is supplied from the image compression unit 44*b* to the graphic controller 45.

The graphic controller 45 converts the supplied image data and moving image data into bitmap data, and performs graphics processing such that a desired image display is made on the screen of the display unit 46. That is to say, a GUI display is made of a movement range image display, entire image display, specified image display, buttons, and so forth. Details of the display will be described later.

Also, the graphic controller 45 performs image processing, and detects image changes. Image changes are changes occurring in a reference image. For example, in a view mode, comparison is made with a previously-stored reference image, and image differences are detected. An image taken at a predetermined time of the previous day is set as the reference image, difference in pixels between the subsequently stored images and the reference image is detected, and in the event that the absolute value of difference in pixels is equal to or greater than a predetermined value, this situation is detected as change having occurred. A method can be used for detecting the difference, wherein the absolute values of pixels at the same position for each frame at the spatially same position between the image which is being compared and the reference image. Or, instead of detecting difference relating to all pixels, the difference may be computed regarding representative pixels or thinned-out pixels. Further, detection of change can be made by restricting a predetermined color and focusing on objects of that predetermined color.

Upon change being detected, a display is made on the display unit 46 in the form of an alarm or the like, such that the frame where the change was detected can be distinguished from other frames. This alarm can be displayed in forms such as change in brightness, change in color, blinking, or the like, as specific examples. An arbitrary image can be selected for the reference image from the stored images.

As described above, the controller CPU 22 connected to the controller bus 21 performs lens control (e.g., focus, etc.), exposure control (e.g., f-stop, gain, electronic shutter speed, etc.), white balance control, image quality control, and so forth, for the camera units, and also controls the pan units 36*a* and 36*b* and the tilt units 37*a* and 37*b*.

A keyboard 24 and mouse 25 are connected to an I/O port 23, as well as a memory card 26 and clock 27. The JPEG data and MPEG data stored in the main memory 42*a* and 42*b* with the positional information and meta data attached thereto can be written to the memory card 26. Also, time data is obtained from the clock 27.

The main memory 42*a* and 42*b* are configured of hard disks or the like, where the JPEG data and MPEG data taken with the camera units 3*a* and 3*b* and with the positional information and meta data attached thereto is stored.

Also, while FIGS. 2 and 3 show the components being connected to the controller bus 21, an arrangement may be made wherein the camera units and the computer are installed at different locations, and connected by IEEE 1394, USB, or a like protocol. In this case, optical fiber is used for the physical transfer path. Using optical fiber allows the camera units and the controlling computer to be installed at locations separated by up to several kilometers. These may also be connected by a wireless LAN.

Figure 4:
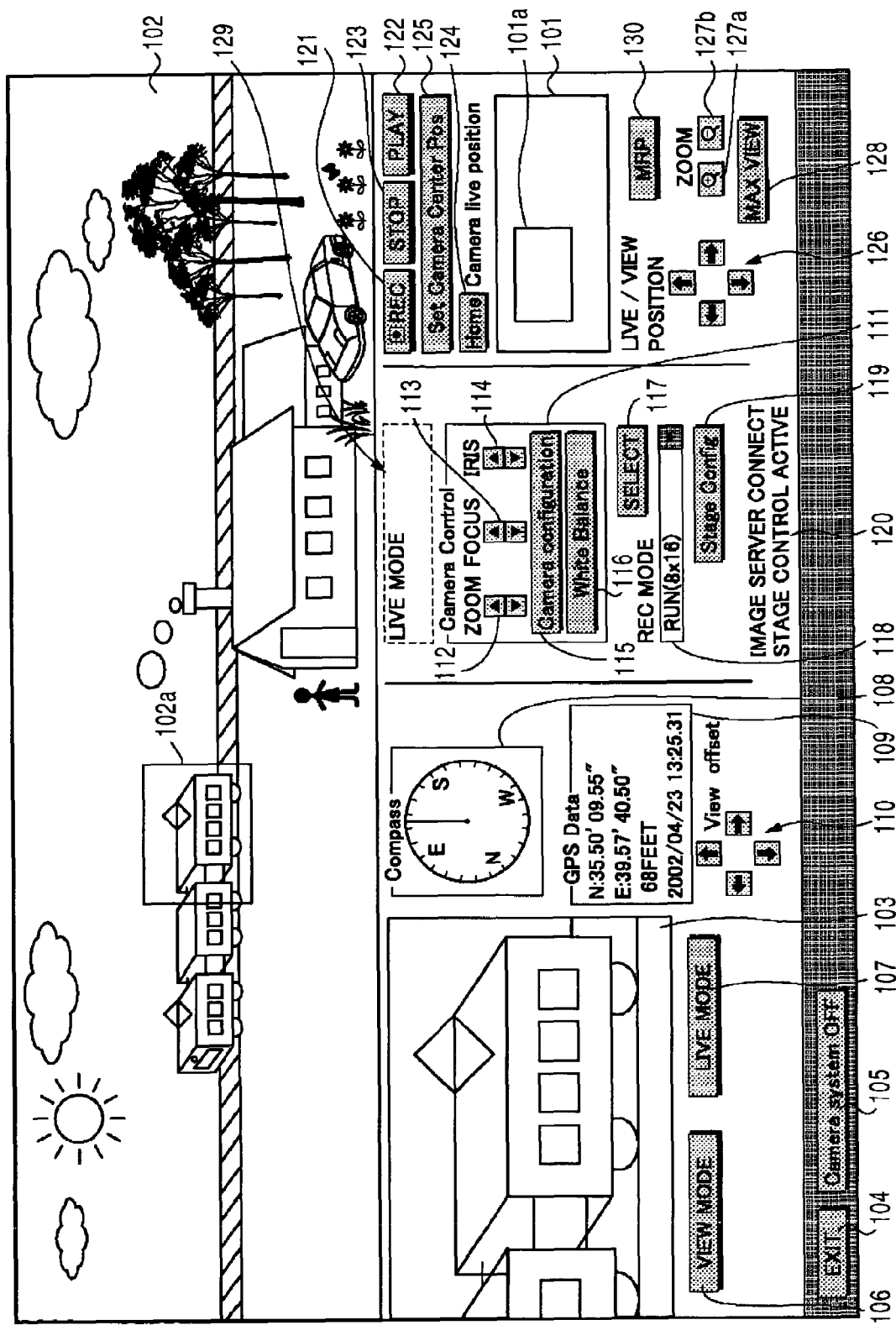
FIG. 4 is a drawing describing an example of a screen display with the embodiment of the present invention.

FIG. 4 illustrates a GUI screen example according to an embodiment of the present invention. The display portions, operating buttons, and display regions with this GUI screen according to the embodiment of the present invention will be described with reference to FIG. 4. A movement range image display portion 101, entire image display portion 102, and specified image display portion 103, are arranged on one screen.

The movement range image display portion 101 displays a movement range image. A movement range image is an image indicating the maximum range over which the camera unit is capable of taking images, and consists of multiple frames. Accordingly, with the embodiment, the movement range image is a panorama-like image as shown in the drawing. As described above, the maximum value for the pan angle is ±90°, the maximum value for the tilt angle is ±45°, and the movement range image is generated from the multiple frames taken in this maximum movement range. Note that positional information attached to the multiple frames making up the movement range image are assembled into the movement range image display portion 101.

Upon a later-described MRP (Movable Range Picture) display button 130 being clicked, or upon the camera unit being installed and image-taking being started, the camera unit is moved over the maximum movement range thereof, and a thumbnail image obtained by thinning out the number of pixels of the image, configured of the multiple frames obtained by moving the camera unit over the maximum movement range, in the vertical and horizontal direction, is used as the movement range image. Or, an arrangement may be made wherein all frames making up the movement range image are taken at predetermined time intervals, and stored and/or displayed.

An entire image display frame 101a (second sighting line) for recognizing the range displayed on the entire image display portion 102 is displayed on the movement range image display portion 101. Moving the entire image display frame 101a with the mouse 25 allows a desired range within the movement range image to be instructed, and the camera unit can be controlled to take the instructed range. That is to say, an M by N number of frames (still images) are taken within the instructed range, and stored and/or displayed.

Figure 5A:
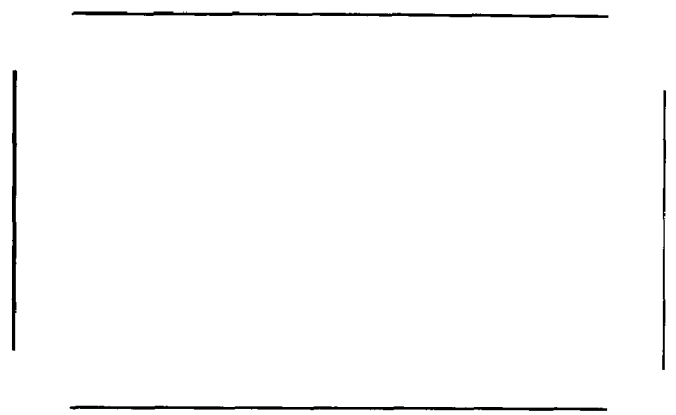
FIGS. 5A through 5C are drawings describing examples entire image display frames with the embodiment of the present invention.
Figure 5B:
Figure 5C:
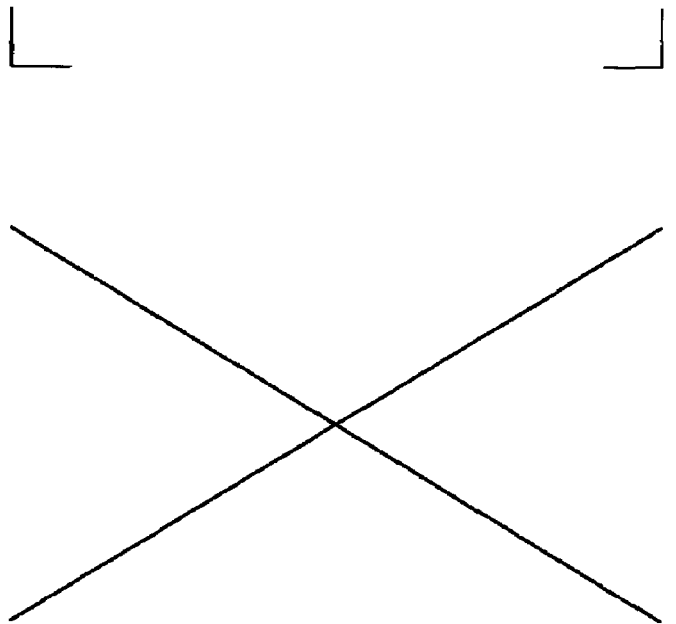

Note that the entire image display frame 101a is only one example, and that various arrangements may be made so that the range displayed on the entire image display portion 102 is displayed on the movement range image display portion 101. Specific examples include showing the four sides of the range displayed in the entire image display portion 102 as indicated in FIG. 5A, showing the four corners of the range displayed in the entire image display portion 102 as indicated in FIG. 5B, and showing the four corners and center of the range displayed in the entire image display portion 102 as indicated in FIG. 5C.

The size of the entire image display frame 101a is the size of 8×16 frames displayed on the movement range image display portion 101, as one example. This size matches the image size of the recording mode selected with the later-described REC MODE selection menu 118. Accordingly, the size of the entire image display frame 101a may be the size of 4×8 frames or the size of 2×4 frames, for example, as described later. Also, it should be noted that the size of each frame depends on the magnification of the lens unit 31a.

In the event of moving the entire image display frame 101a, as one example, a frame which is the center of the entire image display frame 101a is selected with the mouse 25, following which the entire image display frame 101a is displayed so that the selected frame is at the center. Or, an arrangement may be made wherein the entire image display frame 101a is moved synchronously with the movement of the mouse 25, or wherein one frame at the upper left corner for example, or two frames at diagonally opposing corners of the entire image display frame 101a, the upper left and lower right corners, for example, are selected with the mouse 25. Thus, the camera unit 3a is controlled so as to take images of a range corresponding to the entire image display frame 101a of which position has moved, and the optical axis of the camera unit 3a is directed thereto.

Also, the panorama-like entire image selected with the entire image display frame 101a is displayed on the entire image display portion 102. The entire image is an image wherein the JPEG data corresponding to the taken original image is compressed at the image compression unit 44a. Viewing the displayed entire image allows monitoring to be carried out. Also, as described above, detecting change in the image causes the frame regarding which change has been detected in the entire image displayed on the entire image display portion 102 be displayed differently from the other frames, thus warning the user.

The camera unit is moved to take images in the range selected with the entire image display frame 101a at predetermined time intervals, and a thumbnail obtained by thinning out the number of pixels of the image, configured of the multiple frames obtained thereby, in the vertical and horizontal direction, is used as the entire image. Or, an arrangement may be made wherein all taken images are stored.

A specified image display frame 102a (first sighting line) for recognizing the range displayed on the specified image display portion 103 is displayed on the entire image display portion 102. Note that the specified image display frame 102a is only an example, and an arrangement may be made wherein the range is shown in the specified image display portion 103 displayed on the entire image display portion 102 in various shapes as shown in FIGS. 5A through 5C, in the same way as with the above-described entire image display frame 101a.

The specified image display frame 102a may be a specified image display frame 102a set to a predetermined size, or may be a specified image display frame 102a with an arbitrary size set with the mouse 25. Also, in the event of moving the specified image display frame 102a, the specified image display frame 102a may be moved synchronously with movement of the mouse 25, and as one example, the size of the specified image display frame 102a may be set again by selecting diagonally opposing corners of the specified image display frame 102a, the upper left and lower right corners, for example, with the mouse 25, as an example. Thus, the camera unit 3b is controlled so as to take a range corresponding to the specified image display frame 102a moved to a different position, toward which the optical axis of the camera unit 3b is directed.

The specified image selected with the specified image display frame 102a is displayed on the specified image display portion 103. The displayed specified image is an image taken with the camera unit 3b. The camera unit 3b is controlled so as to assume the image angle of the selected specified image, the moving image is taken, and displayed on the specified image display portion 103.

The EXIT button 104 is a button for turning the electric power supply to the monitoring system off. The Camera System OFF button 105 is a button for turning the electric power supply to the camera units off.

The VIEW MODE button 106 is for switching the mode of the monitoring system to a view mode. The view mode is a mode wherein the entire image and a partial image are displayed based on image data stored in the main memory 42a, 42b, and stored in other servers.

The LIVE MODE 107 is a button for switching the mode of the monitoring system to a live mode. The live mode is a mode wherein the entire image and specified image are displayed, based on the frames currently taken by the camera units.

The Compass display area 108 is an area for displaying a compass indicating the direction in which the optical axis of the lenses of the camera units 3a or 3b is directed. The GPS Data display area 109 is an area for displaying the latitude, longitude, altitude, and time-and-date of the location where the camera units 3a and/or 3b are installed. The data displayed on the areas 108 and 109 is data measured with the GPS devices 40a and 40b provided to the camera units 3a and 3b.

The View offset button 110 is a button for adjusting the position of the frame selected with the entire image display portion 102. The View offset button 110 is for vertically or horizontally moving one frame selected from the entire image displayed on the entire image display portion 102, with the mouse 25. The multiple frames making up the entire image are displayed overlapping the adjacent frames by a predetermined number of pixels, i.e., 16 pixels in the horizontal and vertical directions. Moving the frames within the range of this overlapping portion allows the frames to be matched with the adjacent frames, so the display can be made smoother.

The mode display area 129 is an area for displaying mode information, alarm information, error information, and so forth. The mode information is information for notifying the user of the mode of the monitoring system. Specifically, this is information of the live mode and view mode, and so forth. The alarm information is information for warning the user, and is displayed at the point that the range over which the frame can be moved with the aforementioned View offset button 110 has reached the limit, for example. Error information is information for notifying the user of an error occurring in the monitoring system.

The Camera Control unit 111 comprises a ZOOM button 112, a FOCUS button 113, an IRIS button 114, a Camera Configuration button 115, and a White Balance button 116. The ZOOM button 112 is for adjusting how much the camera unit is to zoom in. The FOCUS button 113 is a button for adjusting the focus of the camera unit. The IRIS button 114 is a button for adjusting the iris of the camera unit. The Camera Configuration button 115 is for adjusting the gamma properties, shutter speed, gain properties, and so forth of the camera unit. The White Balance button 116 is a button for adjusting the white balance of the camera unit. Note that an arrangement may be made wherein, in the event that the camera system is in the view mode, the display of the Camera Control unit 111 is omitted.

The SELECT button 117 is a button for displaying a selection screen in the view mode. The selection screen is an image for determining an area where playing and recording is desired on the entire image display portion 102, from the frames making up the entire image.

FIG. 6 illustrates an example of the selection screen. As shown in FIG. 6, the selection screen is made up of a close button 151, an image display portion 152, and a close button 153. The close buttons 151 and 153 are clicked to close the selection screen. The image display portion 152 has a grid superimposed, which sections the frames as to the entire image. In the event that a certain frame at the desired position in the image display portion 152 is specified with a pointer for example, the frame is selected, and the brightness, resolution, contrast, or the like of the specified frame is changed, in order to indicate that the frame has been selected.

The REC MODE selection menu 118 is a pull-down menu for selecting a recording mode. Combinations of the image size of the image to be recorded, and recording methods (RUN or SINGLE), are displayed in the pull-down menu. Here, selection for the image size can be made from an entire image made up of 8×16 frames, a partial image made up of 4×8 frames selected from the entire image, and a partial image made up of 2×4 frames selected from the entire image. A partial image is of the position selected from the selection screen. As for the recording method, RUN is a method wherein taken images are recorded at a predetermined cycle (such as once every five seconds), and SINGLE is a method wherein the image is recorded only once. The recording mode is selected from a combination of these.

The Stage Config (Stage Configuration) button 119 is a button for fine adjustment of the precision of moving the stage and so forth. The message area 120 is an area for displaying the present status of connection between the controlling computer and the camera unit, and the present states of controlling the stage of the camera unit. In the event that the controlling computer and the camera unit are connected, "IMAGE SERVER CONNECT" is displayed in the message area 120, as shown in FIG. 4. Also, in the event that the stage of the camera unit is controllable, "STAGE CONTROL ACTIVE" is displayed in the message area 120.

The REC button 121 is a button for starting recording of images, and upon pressing this button, recording corresponding to the recording mode selected at the REC MODE selection menu 118 is started. Specifically, recording is started corresponding to a mode selected from several modes such as RUN (8×16), RUN (4×8), RUN (2×4), SELECT SINGLE RUN (8×16), SELECT SINGLE RUN (4×8), SELECT SINGLE RUN (2×4), and so forth.

The PLAY button 122 is a button for playing the image data stored in the server (in the main memory 40*a* and/or 40*b*). Specifically, pressing the PLAY button 122 displays a stored data display screen. The stored data display screen displays information for identifying the stored image data. This information is based on the information described in a later-described direction file.

Figure 7:
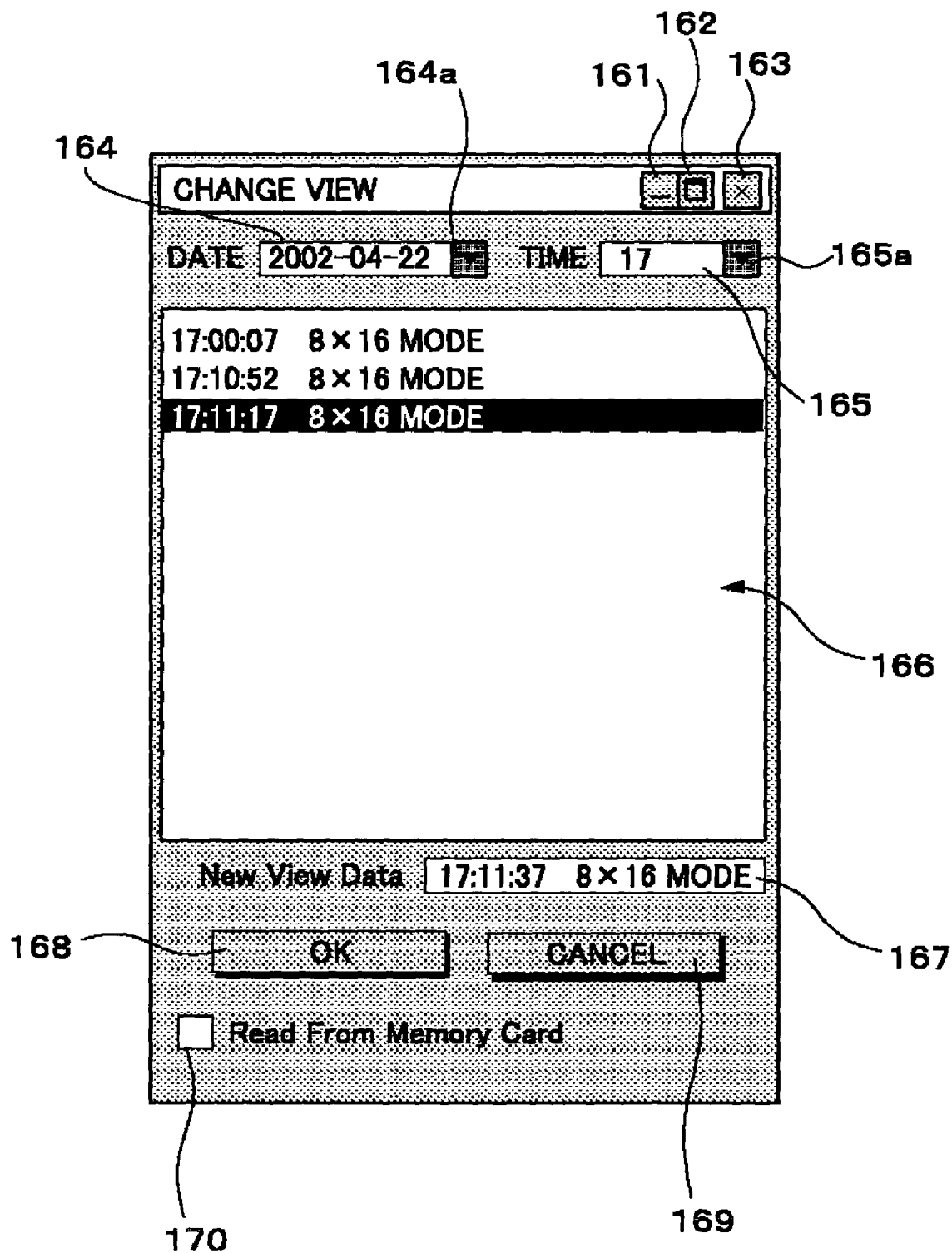
FIG. 7 is a drawing describing an example of a stored data screen display at the time of playing, with the embodiment of the present invention.

FIG. 7 shows an example of a recorded data display screen. As shown in FIG. 7, the recorded data display screen displays a minimization button 161, a maximization button 162, a close button 163, a date specifying space 164, a time specifying space 165, a stored data list space 166, a newest stored data display space 167, an OK button 168, a cancel button 169, and a stored portion changing checkbox 170.

The minimization button 161 is a button clicked for minimizing the stored data display screen, such as for an icon or the like. The maximization button 162 is a button clicked for full-screen display of the stored data display screen. The close button 163 is a button clicked to close the stored data display screen.

The date specifying space 164 is for specifying the date of the stored data to be displayed on the entire image display portion 102. For example, an arrangement may be made wherein clicking a button 164*a* provided to the right edge of the date specifying space 164 displays the dates of stored data which can be displayed in a pull-down menu, so the user can make a selection from the displayed dates.

The time specifying space 165 is for specifying the time of the stored data to be displayed on the entire image display portion 102. For example, an arrangement may be made wherein clicking a button 165*a* provided to the right edge of the time specifying space 165 displays the times of stored data which can be displayed in a pull-down menu, so the user can make a selection from the displayed times.

The stored data list space 166 displays stored data of the date and time specified with the date specifying space 164 and time specifying space 165 from the storage unit. The newest stored data in the stored data stored in the storage unit is displayed in the newest stored data display space 167. Or, an arrangement may be made wherein the newest stored data from the stored data within the date and time specified with the date specifying space 164 and time specifying space 165 is displayed.

The OK button 168 is a button clicked to specify desired stored data, and the cancel button 169 is clicked to close the stored data display screen. The stored portion changing checkbox 170 is a checkbox which is checked to change the destination for reading in the stored data from the storage unit to, for example, detachable semiconductor memory.

Returning to FIG. 4 now, the STOP button 123 is a button for stopping recording or playing actions. The STOP button 123 may be arranged to be displayed upon pressing the REC button 121 or the PLAY button 122.

The Set Camera Center POS (Set Camera Center POSITION) button 125 is a button for specifying the direction which the camera unit is currently facing to be the center of the 8 by 16 frame image.

The HOME button 124 is a button for controlling the camera unit such that the optical axis of the lens of the camera unit is directed toward a home position. The home position is the leftmost position of the camera unit. The LIVE/VIEW POSITION button 126 is a button for panning or tilting the camera unit.

ZOOM buttons 127*a* and 127*b* are buttons for enlarging or reducing the specified image displayed in the specified image display portion 103. The MAX VIEW button 128 is a button for enlarging and displaying the specified image with a separate screen, the entire image display portion 102 for example.

The MRP display button 130 is a button clicked to take multiple frames displayed in the movement range image display portion 101 and to store and/or display these. That is to say, upon the MRP display button 130 being clicked, the widest range capable of being photographed with the camera unit is taken in increments of frames, and all of the frames are grouped based on the positional information of the camera unit which each taken frame has, thereby displaying the grouped frames as a movement range image on the movement range image display portion 101.

Figure 8:
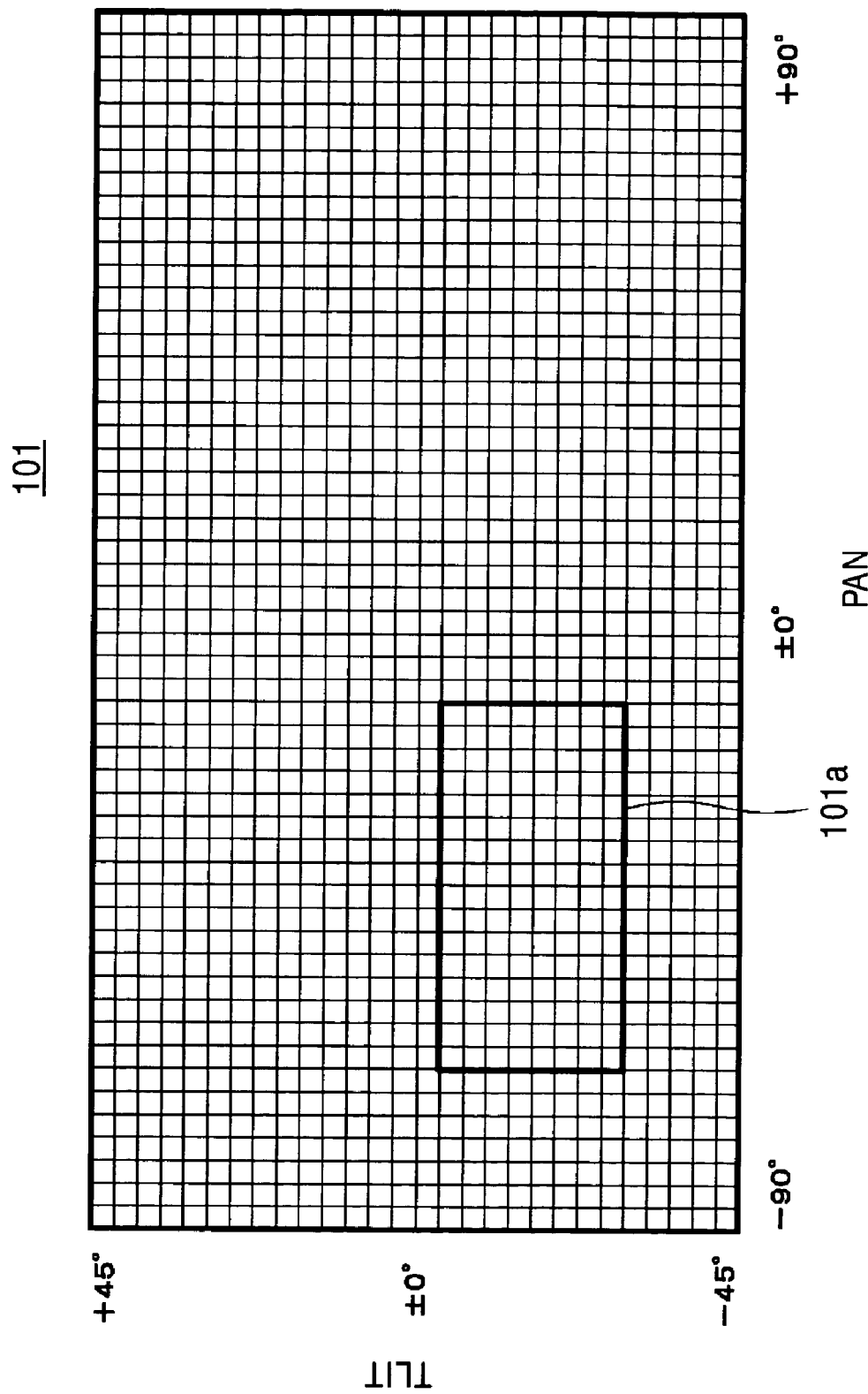
FIG. 8 is a drawing describing an example of a movement range image display unit with the embodiment of the present invention.

Now, the movement range image display portion 101 according to an embodiment of the present invention will be described with reference to FIG. 8. The movement range image displayed in the movement range image display portion 101 is taken by moving the camera unit over the widest range capable and photographing in increments of frames, upon the MRP display button 130 being clicked, or upon the camera unit being installed and image-taking being started, as described above. Thumbnails obtained by thinning out the number of pixels of the multiple frames in the vertical and horizontal direction are grouped based on the positional information of the camera unit, and are displayed as a single image (movement range image) as shown in FIG. 8.

At this time, the positional information of the camera unit attached to each of the frames, and the coordinates within the movement range image display portion 101 are correlated beforehand, so all frames within the movement range can be positioned at the correlated coordinates based on the positional information of the camera unit and grouped, thereby generating a movement range image. With the example shown in FIG. 8, a movement range image having a wide range of a pan direction of 180° and a tilt direction of 90° is generated, and displayed on the movement range image display portion 101.

Each of the frames in the movement range image display portion 101 have elevation angle data indicating the position of the camera unit in the movement range from the pan unit 36a and the tilt unit 37a, and positional information measured with the GPS 40a and meta data. That is, the positional information of the camera unit in a selected range can be obtained, based on the positional information of the selected entire image display frame 101a, by selecting an arbitrary range within the entire image display frame 101a using a mouse 25, with the movement range image having positional information as a GUI. Thus, detailed positional selection can be made by using a movement range image wherein multiple frames displayed on the movement range image display portion 101 are grouped and used as a GUI.

While positional information of the camera unit and meta data are attached to each of the multiple frames grouped as the movement range image with this embodiment, an arrangement may be made wherein the positional information of the camera unit is obtained from the coordinates within the movement range image display portion 101, since the positional information of the camera unit and the coordinates within the movement range image display portion 101 are correlated beforehand.

Now, while the positional information of the camera unit attached to each of the taken frames has been described as being correlated to the coordinates within the movement range image display portion 101 with this embodiment, an arrangement may be made wherein positional information of the camera unit attached to each frame is correlated with pixel positions within the movement range image display portion 101, yielding the same effects.

Also, the present embodiment has been described as selecting an arbitrary range within the entire image display frame 101a using a mouse 25 so as to obtain the positional information of the camera units in the selected range, but an arrangement may be made wherein the positional information of the entirety of the entire image display frame 101a is obtained from the positional information of the GUI at the center of the selected entire image display frame 101a.

Now, the action of an embodiment of the movement range image display portion 101 and entire image display frame 101a according to the present invention will be described. First, the MRP display button 130 displayed on the display unit 46 is clicked using the mouse 25. Upon the MRP display button 130 being clicked, the controller CPU 33 controls the pan unit 36a and the tilt unit 37a, and moves the camera unit to the position of each frame, so as to take the entire movement range.

The image-taking unit 24 takes images in predetermined increments of frames, the taken image is temporarily saved in buffer memory 26, and JPEG format image compression is performed at the JPEG encoder/meta data addition unit 39a. At this time, the positional information and meta data from the GPS unit 40a and the elevation angle data indicating the position of the pan unit 36a and the tilt unit 37a are attached to each frame. The frames with the data attached are saved in the main memory 42a.

The frames saved in the main memory 42a are decoded at the JPEG decoder 43a, and the decoded image data is compressed into thumbnails obtained by thinning out pixels at the image compression unit 44a down to a size suitable for the movement range image. The compressed image is displayed at a predetermined location on the movement range image display portion 101 of the display unit 46 via the graphic controller 45.

The position of the entire image display frame 101a moves by moving the mouse 25 over the movement range image display portion 101. The positional information, meta data, and elevation angle data attached to the frames of the position clicked with the mouse 25 is then read out.

The frames in the range of the entire image matching the positional information and elevation angle data read out are read out from the main memory 42a. The frames read out are decoded at the JPEG decoder 43a, and compressed into thumbnails obtained by thinning out pixels at the image compression unit 44a down to a size suitable for the movement range image. The compressed image is displayed at a predetermined location on the entire image display portion 102 of the display unit 46 via the graphic controller 45. At the same time, the pan unit 36a and the tilt unit 37a are driven based on the positional information and elevation data of the frames read out, so that the orientation of the camera unit, is controlled, and image-taking is performed in this state.

Next, the entire image displayed on the entire image display portion 102 will be described. The entire image display portion 102 displays an entire image formed by reading out the images within the range encompassed by the entire image display frame 101a from the main memory 42a, thinning out the read out images vertically and horizontally to form thumbnails, which are grouped together.

The entire image display portion 102 is made up of multiple frames, as with the movement range image display portion 101. Each of the multiple frames has elevation angle data indicating the position of the camera unit in the movement range from the pan unit 36a and the tilt unit 37a attached thereto, and positional information and meta data measured with the GPS 40a are correlated with coordinates within the entire image display portion 102.

A specified image is selected with the mouse 25, using the entire image display portion 102 having the positional information as a GUI. For example, in the event that a position to serve as the center of a specified image is clicked with the mouse 25, a specified image display frame 102a of a predetermined size is superimposed on the entire image display portion 102. What frame on the entire image the position clicked is situated is calculated, and further, the position within the frame of the clicked position is calculated. The calculated positional information is converted into positional information and elevation angle data which the frame has.

In this way, by selecting an arbitrary point on the entire image serving as a GUI, an image centered on the selected point can be taken, or the positional information and elevation angle data for taking an image including the selected point can be calculated. For example, the positional information and elevation angle data for taking an image surrounded by the specified image display frame 102a of a predetermined size superimposed by selecting a point, can be calculated. The pan unit 36b and the tilt unit 37b of the camera unit 3b are driven based on the positional information and elevation angle data thus calculated, and the field angle of the camera can be instantaneously set to the selected range on the entire image.

Thus, taken images have positional information and elevation angle data, and accordingly can be used as a GUI for controlling the camera. The multiple frames displayed in the entire image and the movement range image are taken with the camera unit 3a, and the positional information and elevation angle data obtained from the pan unit 36a, tilt unit 37a, and GPS 40a is correlated with the entire image and the movement range image. That is to say, with this embodiment, the positional information and elevation angle data obtained form the camera unit 3a is used for controlling the camera unit 3b.

The positions of installment of the camera units 3a and 3b are predetermined, so the camera unit 3b is controlled with the fine-tuned positional information and elevation angle data, taking into consideration the difference between installation position of the camera units 3a and 3b, based on the positional information and elevation angle data obtained from the entire image. Note that however, the location of which images are being taken is sufficiently distant from the installation position of the camera units 32a and 3b being used for surveillance, so the difference in angle of optical axis of the camera units 3a and 3b due to the difference in installation position is practically negligible.

While description has been made with this embodiment that positional information of the camera unit and meta data is attached to each of the multiple frames grouped as the entire image, an arrangement may be made wherein the position information of the camera unit is correlated with the coordinates in the entire image display portion 102, so that the positional information of the camera units can be obtained from the coordinates of the entire image display portion 102.

Also, while the positional information of the camera unit attached to each of the taken frames has been described as being correlated to the coordinates within the entire image display portion 102 with this embodiment, an arrangement may be made wherein positional information of the camera unit attached to each frame is correlated with pixel positions within the entire image display portion 102, yielding the same effects.

Next, an example of the operation of the camera units 3a and 3b according to an embodiment of the present invention will be described with reference to FIG. 9. However, the reference numerals will be slightly changed in FIG. 9; the camera units 3a and 3b will be referred to as camera unit 3, the pan/tilt units 4a and 4b will be referred to as pan/tilt unit 4, and the cameras 5a and 5b will be referred to as camera 5.

Figure 9:
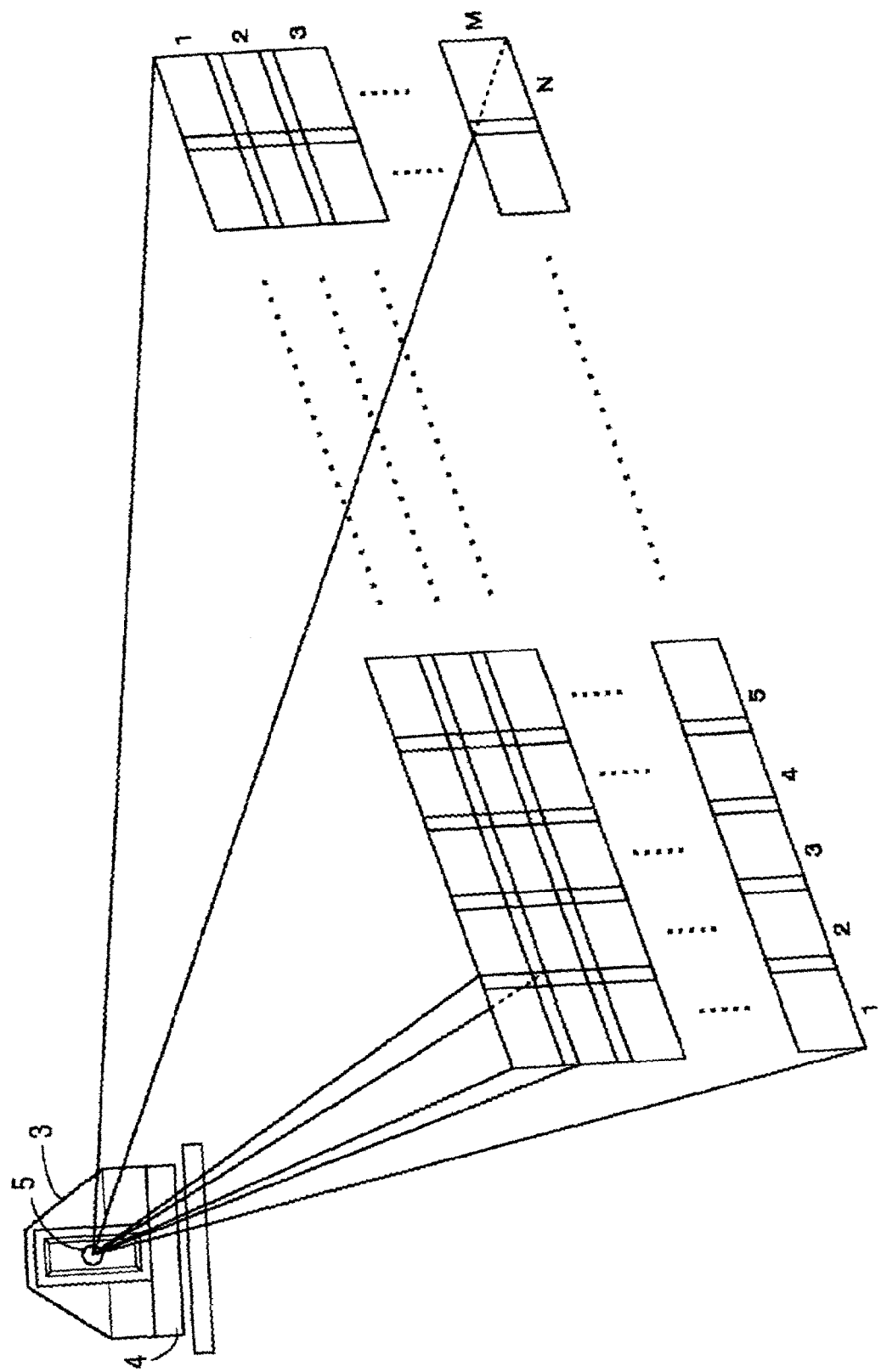
FIG. 9 is a drawing for describing image-taking operations and image acquiring operations with the embodiment of the present invention.

As shown in FIG. 9, the camera unit 3 has the camera 5 mounted on a camera platform on the pan/tilt unit 4, and the image-taking direction can be changed from the home position. In FIG. 9, the M by N frames taken are assigned numbers of 1 through M for each row from above, viewed from the camera unit side, and 1 through N for each column from the left, in order. The home position is the position for taking the frame with the coordinates of (1, 1), for example.

Upon the frame with the coordinates of (1, 1) being taken, the camera unit 3 is tilted downwards, the frame with the coordinates of (2, 1), and the (3, 1), and so forth, through (M, 1), are taken. Next, the frame with the coordinates of (1, 2) at the top of the second column is taken, and this is configured until the final frame with the coordinates of (M, N). As described above, each frame has 16 pixels overlapping with the other frames. The taken frames are each compressed by JPEG or MPEG, and subjected to processing such as storage at the main memory 42a or 42b.

As described above, in the event that each frame is an XGA (1024×768 pixels) image for example, an image made up of 128 frames and approximately 100 million pixels (1024×16=16,384 pixels horizontally and 768×8=6,144 pixels vertically) is obtained, ignoring the overlapping portions. A compressed image or thumbnail image formed of this image is displayed in the above-described entire image display portion 102, and the moving image (frame) to be taken with the camera unit 3b is displayed in the specified image display portion 103.

Figure 10:
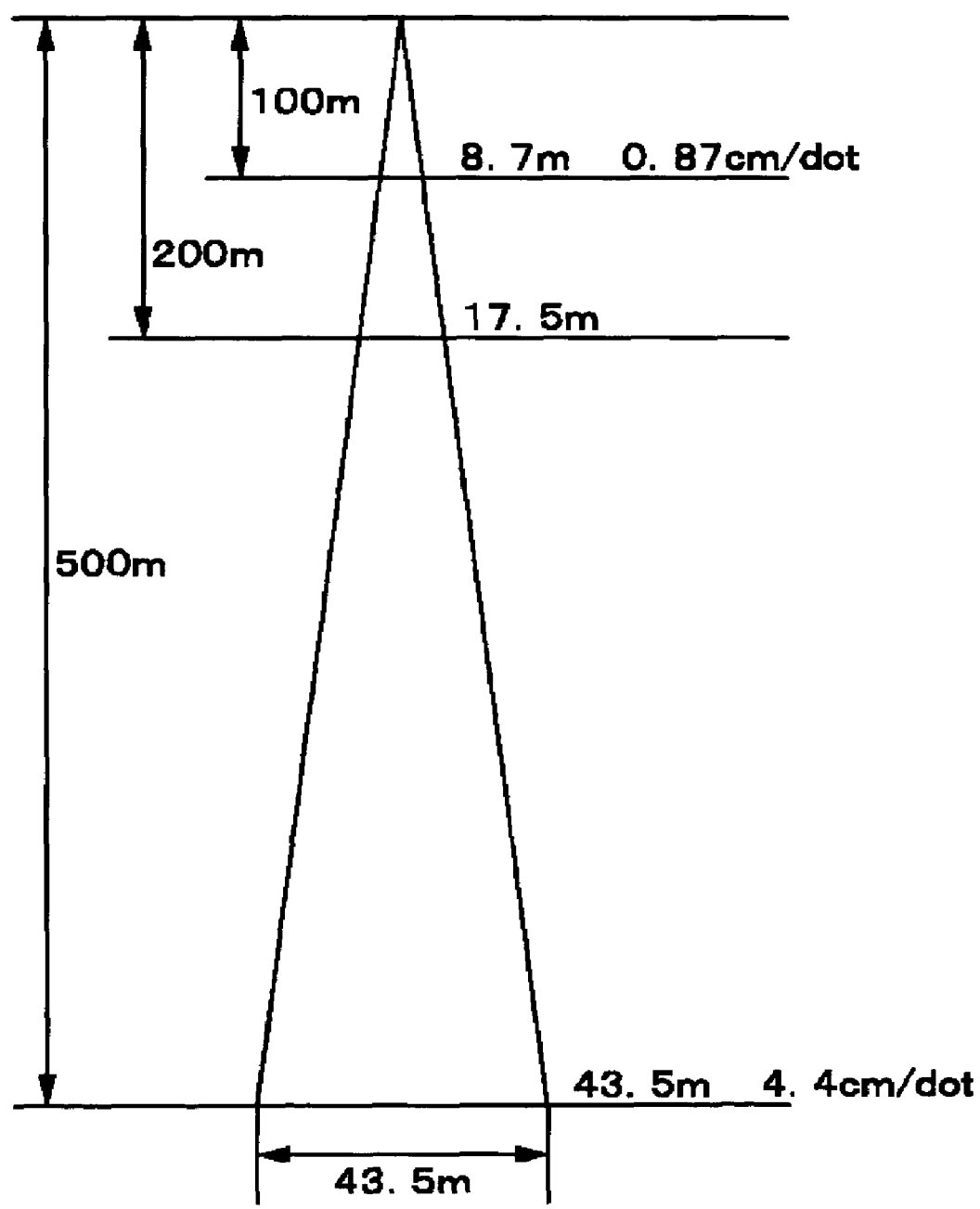
FIG. 10 is a drawing for describing the distance to the subject, the range of image-taking, and resolution, with the embodiment of the present invention.

FIG. 10 illustrates the range which can be photographed as one frame in the event that a 75-power telephoto lens is provided to the camera unit. In the event of the camera unit photographing a subject 100 m away, a range 8.7 m vertical by 11.7 m horizontal can be taken as one frame. For example, in the event that an XGA image-taking device is used for the camera unit, a range of 8.7 cm vertical by 11.7 cm horizontal can be represented as one pixel.

In the event of the camera unit photographing a subject 200 m away, a range 1.74 m vertical by 2.34 m horizontal can be taken as one frame. For example, in the event that an XGA image-taking device is used for the camera unit, a range of 1.74 cm vertical by 2.34 cm horizontal can be represented as one pixel.

In the event of the camera unit photographing a subject 500 m away, a range 4.36 m vertical by 5.84 m horizontal can be taken as one frame. For example, in the event that an XGA image-taking device is used for the camera unit, a range of 4.36 cm vertical by 5.84 cm horizontal can be represented as one pixel.

Figure 11A:
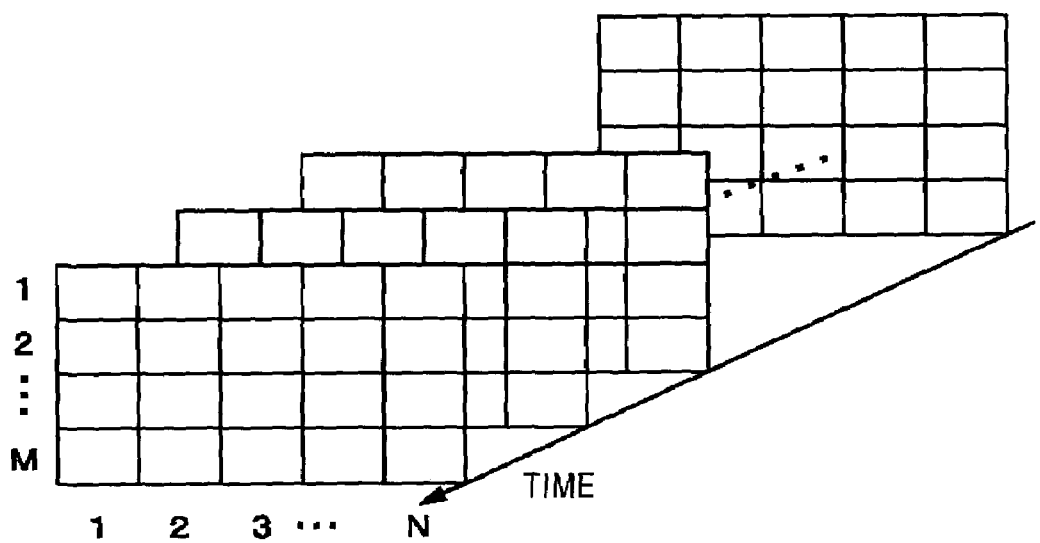
FIGS. 11A and 11B are drawings for describing the say in which taken images are managed.

The data managing method for saving the obtained image data in the archive 10 and the main memory 42a and 42b and the like will be described with reference to FIGS. 11A and 11B. As describe above, M by N frames are taken at predetermined time intervals, compressed, and stored. As shown in FIG. 11A, the position of each frame is stimulated by M rows and N columns. For example, the positional address of (1, 1) specifies the frame at the most upper right. Each frame has this positional address and time information of the time when it was recorded, as the file information. The time information is configured of YYYY/MM/DD/HH/MM/SS. Accordingly, the file name of each frame is (YYYY/MM/DD/HH/MM/SS, positional_information).

Figure 11B:
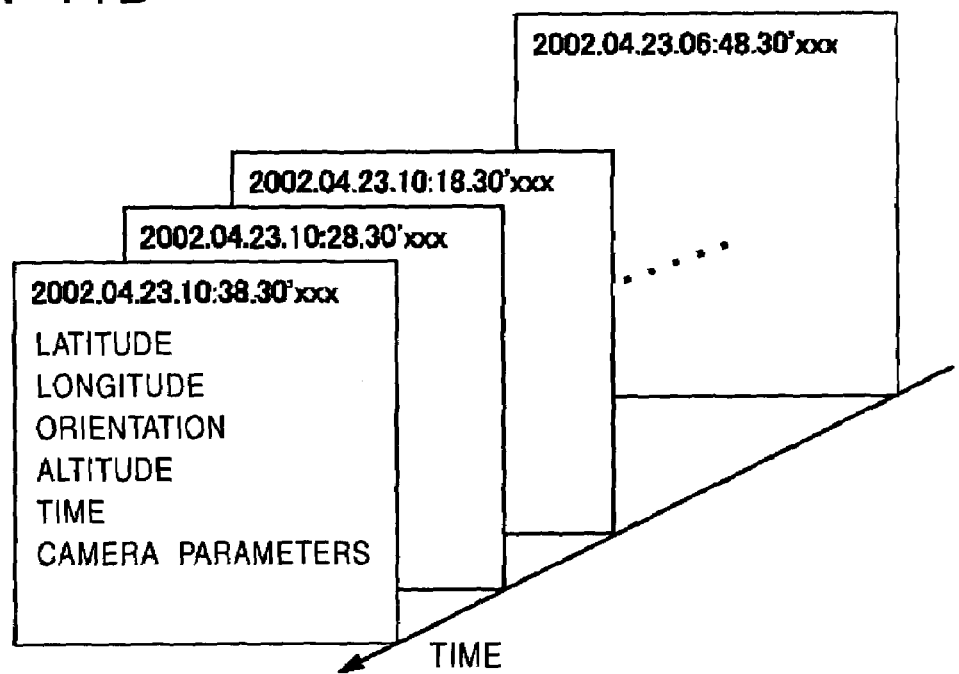

Further, as shown in FIG. 11B, a direction file is stipulated corresponding to one entire image being formed of the M by N frames. The direction file defines the group of the M by N frames by having data the same as the file name (YYYY/MM/DD/HH/MM/SS,positional_information) of the frame having the positional address of (1, 1). Further, the direction file has positional information and meta data regarding this collection of frames. The positional information and meta data is generated at the meta data generating unit 29. That is to say, the direction file has position information of latitude, longitude, orientation, altitude and so forth, and meta data such as camera parameters (magnification, focus value, iris value, etc.).

While the present invention has been described by way of an embodiment, the present invention is by no means restricted to this embodiment, and various modifications and adaptations may be made without departing from the spirit and scope of the invention. For example, while the embodiment describes a specified image as being one, but an arrangement may be made wherein multiple specified images can be displayed. In this case, the camera unit 3b may be made to take multiple specified images in order, for storage and/or display.

Also, with the above-described embodiment, upon the entire image display frame 101a being moved on the movement range image display portion 101 to select a desired range, multiple frames within the selected range are taken, and displayed in the entire image display portion 102, but an arrangement may be made wherein the frames already recorded are read out form the main memory 42a while moving the entire image display frame 101a, and displayed in the entire image display portion 102.

Further, while the embodiments has been described with an arrangement wherein the image data and moving image data taken with the camera units 3a and 3b are displayed on the same display unit 46, an arrangement may be made wherein the moving image data taken with the camera unit 3b is displayed on a dedicated display unit.

What is claimed is:

1. A monitoring system for monitoring a predetermined location, comprising:
    an entire image display portion for storing in a storage unit image data derived from a first camera unit capable of taking images from different imaging directions, and position information associated with each set of image data, said entire image display portion displaying either compressed images of said image data having been compressed from said first camera unit or compressed images of said image data read from said storage unit and then being compressed, at a position based on position information associated with a set of said displayed image data, with the position information of a respective set of image data being assembled therein;
    a specified image display portion for deriving moving image data from a second camera unit capable of taking images from changeable directions and displaying said moving image data; and
    a movement range image display portion for storing in a storage unit image data, derived from different positions from said first camera unit over all image-taking directions in a maximum movement range thereof, with position information associated with each set of said image data derived from different positions from said first camera unit over all image-taking directions in a maximum movement range thereof, said third image display portion displaying either compressed images of said image data derived from the first camera unit over all image-taking directions in a maximum movement range thereof having been compressed from said first camera unit or compressed images of said image data derived from the first camera unit over all image-taking directions in a maximum movement range thereof read from said storage unit and then being compressed, at a position based on associated position information, with the position information of a respective set of said image data sets derived from the first camera unit over all image-taking directions in a maximum movement range thereof being assembled therein,
    wherein a predetermined range is selected with a first indicating display and superimposed on said entire image display portion, and said moving image data is derived within said predetermined range,
    wherein the movement range image display portion does not display all images from the first camera unit that are within the movement range, the movement range image display portion displays only particular images within the movement range the particular images selected from the group consisting of images showing four sides of the movement range, images showing the four corners of the movement range, and images showing the four corners and center of the movement range, and
    wherein the movement range image display portion, the entire image display portion, and the specified image display portion are displayed simultaneously in mutually different regions that do not overlap one another.

2. The monitoring system according to claim 1, wherein display information of a range indicated by a second indicating display superimposed on said movement range image display portion is displayed on said entire image display portion.

3. The monitoring system according to claim 2, wherein, while selection is being made with said first or second indicating displays, and during the time from said selection until starting of image-taking of said selected range, image data within said predetermined range selected with said first or second indicating displays is read out from said storage unit and displayed on said specified or entire image display portion.

4. The monitoring system according to claim 2, wherein, upon selection of an arbitrary point on said entire or movement range image display portion, said first or second indicating displays are superimposed on said entire or movement image display portion according to said selected arbitrary point.

5. A monitoring method for monitoring a predetermined location, comprising:
    a step for storing in a storage unit image data, derived from a first camera unit capable of taking images from different imaging directions, and position information associated with each set of image data;
    a step for displaying an entire image display portion, either compressed images of said image data having been compressed from said first camera unit or compressed images of said image data read from said storage unit and then being compressed, at a position based on position information associated with a set of said displayed image data, with the position information of a respective set of image data being assembled therein;
    a step for deriving moving image data from a second camera unit capable of taking images from changeable directions;
    a step for displaying said moving image data on a specified image display portion; and a step of using a movement range image display portion for storing in a storage unit image data, taken of different positions with said first camera unit over all image-taking directions in the maximum movement range thereof, with position information attached to each set of image data taken over all image-taking directions in the maximum movement range, and displaying in the movement range image display portion either compressed images of said taken image data derived from the first camera unit over all image-taking directions in a maximum movement range thereof having been compressed from the first camera or compressed images of said image data derived from the first camera unit over all image-taking directions in a maximum movement range thereof stored in said storage unit having been compressed, at a position based on corresponding position information of a respective set of said set of image data derived from the first camera unit over all image-taking directions in a maximum movement range thereof being assembled therein, wherein a predetermined range is selected with a first indicating display and superimposed on said entire image display portion, and said moving image data is derived within said predetermined range wherein the movement range image display portion does not display all images from the first camera unit that are within the movement range, the third image display portion displays only particular images within the movement range the particular images selected from the group consisting of images showing four sides of the movement range, images showing the four corners of the movement range, and images showing the four corners and center of the movement range, and wherein the movement range image display portion, the entire image display portion, and the specified image display portion are displayed simultaneously in mutually different regions that do not overlap one another.

6. The monitoring system according to claim 5, wherein an image of a range indicated by a second indicating display superimposed on said movement range image display portion is displayed on said entire image display portion.

7. The monitoring method according to claim 6, wherein, while selection is being made with said first or second indicating displays, and during the time from selection with said first or second indicating displays until starting of image-taking of said selected desired range, image data within said predetermined range selected with said first or second indicating displays is read out from said storage unit and displayed on said specified or entire image display portions.

8. The monitoring method according to claim 6, wherein, upon an arbitrary point on said entire or movement range image display portion being selected, said first or second indicating displays are superimposed on said entire movement range image display portion according to said selected arbitrary point.

9. A computer-readable medium encoded with a program for causing a computer to execute a monitoring method for monitoring a predetermined location by:

storing in a storage unit image data, derived from a first camera unit capable of taking images from different imaging directions, and position information associated with each set of image data;

displaying on an entire image display portion, either compressed images of said image data having been compressed from said first camera unit or compressed images of said image data read from said storage unit and then being compressed, at a position based on position information associated with a set of said displayed image data, with the position information of a respective set of image data being assembled therein;

deriving moving image data from a second camera unit capable of taking images from changeable directions;

displaying said moving image data on a specified image display portion; and using a movement range image display portion for storing in a storage unit image data, taken of different positions with said first camera unit over all image-taking directions in the maximum movement range thereof, with position information attached to each set of image data taken over all image-taking directions in the maximum movement range, and displaying in the movement range image display portion either compressed images of said taken image data derived from the first camera unit over all image-taking directions in a maximum movement range thereof having been compressed from the first camera or compressed images of said image data derived from the first camera unit over all image-taking directions in a maximum movement range thereof stored in said storage unit having been compressed, at a position based on corresponding position information of a respective set of said set of image data derived from the first camera unit over all image-taking directions in a maximum movement range thereof being assembled therein, wherein a predetermined range is selected with a first indicating display and superimposed on said entire image display portion, and said moving image data is derived within said predetermined range, wherein the movement range image display portion does not display all images from the first camera unit that are within the movement range, the movement range image display portion displays only particular images within the movement range the particular images selected from the group consisting of images showing four sides of the movement range, images showing the four corners of the movement range, and images showing the four corners and center of the movement range, and wherein the movement range image display portion, the entire image display portion, and the specified image display portion are displayed simultaneously in mutually different regions that do not overlap one another.

* * * * *